(12) United States Patent
Artini et al.

(10) Patent No.: US 7,400,951 B2
(45) Date of Patent: Jul. 15, 2008

(54) METHOD AND DEVICE FOR AUTOMATIC GUIDANCE OF AN AIRCRAFT, FOR A FLIGHT AT LEAST IN PART AT LOW ALTITUDE

(75) Inventors: Franck Artini, Toulouse (FR); Edward Strongman, Bretx (FR)

(73) Assignee: Airbus France, Toulouse (FR)

( * ) Notice: Subject to any disclaimer, the term of this patent is extended or adjusted under 35 U.S.C. 154(b) by 582 days.

(21) Appl. No.: 11/121,122

(22) Filed: May 4, 2005

(65) Prior Publication Data

US 2005/0273249 A1 Dec. 8, 2005

(30) Foreign Application Priority Data

May 18, 2004 (FR) .................................. 04 05378

(51) Int. Cl.
*G05D 1/04* (2006.01)
*G08G 5/04* (2006.01)
(52) U.S. Cl. ................... 701/3; 701/11; 701/18; 340/967; 342/65
(58) Field of Classification Search ............ 701/3, 701/4, 5, 9, 10, 11, 15, 16, 18, 301; 340/951, 340/967, 970, 979, 982, 961; 342/65, 63, 342/64, 179; 244/178
See application file for complete search history.

(56) References Cited

U.S. PATENT DOCUMENTS

| 4,024,539 | A | * | 5/1977 | Quinlivan et al. | ........... | 342/179 |
| 4,646,244 | A | * | 2/1987 | Bateman et al. | ............. | 701/301 |
| 5,631,640 | A | * | 5/1997 | Deis et al. | .................... | 340/961 |
| 5,638,282 | A | | 6/1997 | Chazelle et al. | | |
| 5,706,011 | A | | 1/1998 | Huss et al. | | |
| 5,892,462 | A | * | 4/1999 | Tran | ........................... | 340/961 |
| 5,922,031 | A | | 7/1999 | Larrieu | | |
| 6,480,120 | B1 | | 11/2002 | Meunier | | |
| 6,708,091 | B2 | * | 3/2004 | Tsao | ............................ | 701/9 |

FOREIGN PATENT DOCUMENTS

| FR | 2689668 | 10/1993 |
| FR | 2741320 | 5/1997 |
| FR | 2747492 | 10/1997 |

OTHER PUBLICATIONS

Preliminary Search Report dated Dec. 16, 2004 with English translation.

* cited by examiner

*Primary Examiner*—Tan Q Nguyen
(74) *Attorney, Agent, or Firm*—Dickinson Wright, PLLC

(57) ABSTRACT

A method of automatically guiding an aircraft for flight at low altitude determines an LLF (low level flight) trajectory section for following terrain to be overflown by the aircraft. The LLF trajectory section takes account of predictions of the aircraft's mass and speed and climb and descent performance. The LLF trajectory section includes an entry point and an exit point. The LLF trajectory section is integrated between a first trajectory part corresponding to a first phase of flight and a second trajectory part corresponding to a second phase of flight, by providing respectively first and second transition phases. The aircraft is automatically guided so that it successively captures, follows, and leaves the LLF trajectory section.

25 Claims, 14 Drawing Sheets

METHOD AND DEVICE FOR AUTOMATIC GUIDANCE OF AN AIRCRAFT, FOR A FLIGHT AT LEAST IN PART AT LOW ALTITUDE

FIELD OF THE INVENTION

The present invention relates to a method and a device for automatic guidance of an aircraft, for a flight at least in part at low altitude.

SUMMARY OF THE INVENTION

Although not exclusively, the present invention applies more particularly to a military transport plane which is generally very heavy and whose maneuvering times are in general relatively slow.

Within the framework of the present invention, the expression low altitude flight is understood to mean flight along a flight trajectory (at low altitude) allowing an aircraft to follow as closely as possible the terrain overflown, in particular to avoid being pinpointed. A low altitude flight trajectory (or part of trajectory) such as this is therefore situated at a predetermined terrain height, for example 500 feet (around 150 meters).

The subject of the present invention is a method of automatic guidance of an aircraft, for a flight at least in part at low altitude.

According to the invention, said method is noteworthy in that:
a) at least one LLF trajectory section corresponding to a low altitude trajectory part which makes it possible to follow the terrain overflown, which is able to be flown by the aircraft and which takes account of predictions of mass and of speed, as well as of predictions of climb and descent performance of the aircraft are determined, said LLF trajectory section comprising an entry point and an exit point;
b) said LLF trajectory section is integrated between a first trajectory part corresponding to a first phase of flight and a second trajectory part corresponding to a second phase of flight, by providing respectively first and second transition phases; and
c) the aircraft is guided automatically in such a way that, successively, it captures, follows and leaves said LLF trajectory section.

Thus, by virtue of the invention, the aircraft can be made to fly at low altitude along said LLF trajectory section (LLF standing for "Low Level Flight") between said first and second phases of flight which are, for example, cruising phases.

Furthermore,
in a first variant, at least one of said two transition phases (namely a phase of capture and a phase of exit of the LLF trajectory section, as will be seen in greater detail hereinbelow) corresponds to a transition at constant slope; and
in a second variant, at least one of said transition phases corresponds to a transition exhibiting a plurality of horizontal levels (for example air traffic control constraints).

Advantageously, a capture point corresponding to the start of said first transition phase (intended to capture said LLF trajectory section) is updated automatically, especially by taking account of a profile of the terrain. Thus, the capture phase is always made secure with respect to the terrain.

In a first embodiment, said LLF trajectory section (is planned and) forms parts of a planned flight trajectory, especially during mission preparation. It may also be modified in flight. It is also possible to form it and to insert it during a flight.

In this case, in a first implementation, to engage the following of said planned LLF trajectory section in a managed mode, the pilot is forewarned when the aircraft is a predetermined distance upstream of a capture point corresponding to the start of said first transition phase intended to capture said LLF trajectory section, and he is then invited to enable an LLF guidance mode comprising an automatic capture mode and an automatic following mode, respectively, for capturing and following said LLF trajectory section.

Within the framework of the present invention, the expressions below are understood to have the following meanings:
managed mode, a mode of guidance according to which the aircraft is guided by an automatic piloting device which is controlled automatically by a flight management computer. This automatic piloting device automatically guides the aircraft according to a specific target (or preset) calculated automatically: angle of climb, angle of descent, lateral trajectory; and
selected mode, a mode of guidance according to which the aircraft is guided by an automatic pilot which is controlled on the basis of references selected and entered manually by a pilot, such as heading, altitude and/or speed. The aircraft is then guided automatically according to a law comprising a specific target (or preset): vertical speed, altitude, climb, descent, course, heading, etc.

Moreover, within the framework of the present invention:
a mode is engaged when it is activated;
a (nonactivated) mode must be enabled in order to be able to be engaged; and
a mode is disengaged when it is neither activated nor engaged.

In the first aforesaid implementation, advantageously:
a) if the pilot enables said LLF guidance mode before the aircraft reaches said capture point (more precisely a start point of transition to the low altitude flight), said LLF guidance mode is engaged automatically as regards capture at said capture point, and as regards following when the LLF trajectory section is captured, at the entry point of said LLF trajectory section; and
b) if the pilot enables said LLF guidance mode at a first auxiliary point downstream of said capture point, the engagement of said LLF guidance mode is delayed until said first auxiliary point, at which it is then engaged automatically as regards capture, and as regards following it is engaged automatically when the LLF trajectory section is captured, at a second auxiliary point situated on said LLF trajectory section downstream of said entry point. Preferably, in this case, said second auxiliary point is indicated to a pilot of the aircraft, for example on a standard display screen.

Furthermore, advantageously, to leave an LLF trajectory section, in a managed mode, the pilot is forewarned when the aircraft is a predetermined distance upstream of the exit point corresponding to the end of the LLF trajectory section, and he is then invited to enable an exit mode for automatically exiting said LLF trajectory section, said exit mode being engaged automatically when the aircraft arrives at said exit point.

In a particular variant, said exit mode implements an exit with horizontal levels and wherein, when a horizontal level of said exit (with horizontal levels) is incompatible with a profile of the terrain, that is to say intercepts said profile of the terrain, an alarm signal is emitted.

In a second implementation pertaining to said first embodiment (relating to a planned LLF trajectory section), to engage the following of said planned LLF trajectory section, in a selected mode such as mentioned above, the pilot chooses a capture law.

Advantageously, there is an automatic switch from said selected mode to a managed mode when the aircraft piloted according to said capture law intercepts said first capture transition phase or said LLF trajectory section.

Furthermore, advantageously, to leave an LLF trajectory section, in a selected mode, the pilot chooses an exit law.

Additionally, in a second embodiment, said LLF trajectory section (called the "chance LLF trajectory section") is determined automatically during a flight of the aircraft. This relates to the situation where no LLF trajectory section is available onboard the aircraft and where the pilot requests guidance according to such an LLF trajectory section.

For this purpose, according to the invention:
said entry point of the LLF trajectory section is situated a predetermined distance ahead of the current position of the aircraft; and
said exit point of the LLF trajectory section is situated a predetermined distance ahead of said entry point.
Furthermore, advantageously:
the slope of a transition phase at constant slope corresponds to a predetermined slope, which is modifiable by a pilot of the aircraft; and
the speed of the aircraft along the LLF trajectory section corresponds to a predetermined speed, which is modifiable by a pilot of the aircraft.

In a preferred variant embodiment, said LLF trajectory section and said exit point are modified continuously in such a way that they displace together with the aircraft, ahead of the position of said aircraft.

In this case, advantageously, if said LLF trajectory section which is displacing encounters an auxiliary LLF trajectory section, planned in particular during mission preparation (as indicated above), these two LLF trajectory sections are merged to form a single overall LLF trajectory section.

In a particular implementation, said first trajectory part is an auxiliary LLF trajectory section, which has been planned during mission preparation. In this case, by virtue of the invention, one is able to continue to make the aircraft fly at low altitude, at the end of a planned low altitude LLF trajectory section (namely said auxiliary LLF trajectory section), by providing a chance LLF trajectory section.

Additionally, advantageously:
in a first variant implementation, said first and second trajectory parts are parts of a standard planned flight trajectory;
in a second variant implementation, at least one of said first and second trajectory parts is a planned low altitude flight trajectory capture trajectory. This relates to the case where the aircraft has been diverted from the initially planned low altitude flight trajectory, for example when the crew tried to follow at low altitude a better configuration of the terrain (valley, etc) to benefit from more effective masking by said terrain, and when the aircraft must now return to said planned low altitude flight trajectory by following said capture trajectory.

The present invention also relates to a device for automatic guidance of an aircraft, for a flight at least in part at low altitude.

According to the invention, said device is noteworthy in that it comprises:
means for determining at least one LLF trajectory section corresponding to a low altitude trajectory part, which makes it possible to follow the terrain overflown, which is able to be flown by the aircraft and which takes account of predictions of mass and of speed, as well as predictions of climb and descent performance of the aircraft;
means for automatically guiding the aircraft in such a way that, successively, it captures, follows and leaves said LLF trajectory section.

BRIEF DESCRIPTION OF THE DRAWINGS

The figures of the appended drawing will elucidate the manner in which the invention may be embodied. In these figures, identical references designate similar elements.

DETAILED DESCRIPTION OF THE INVENTION

Figure 1:
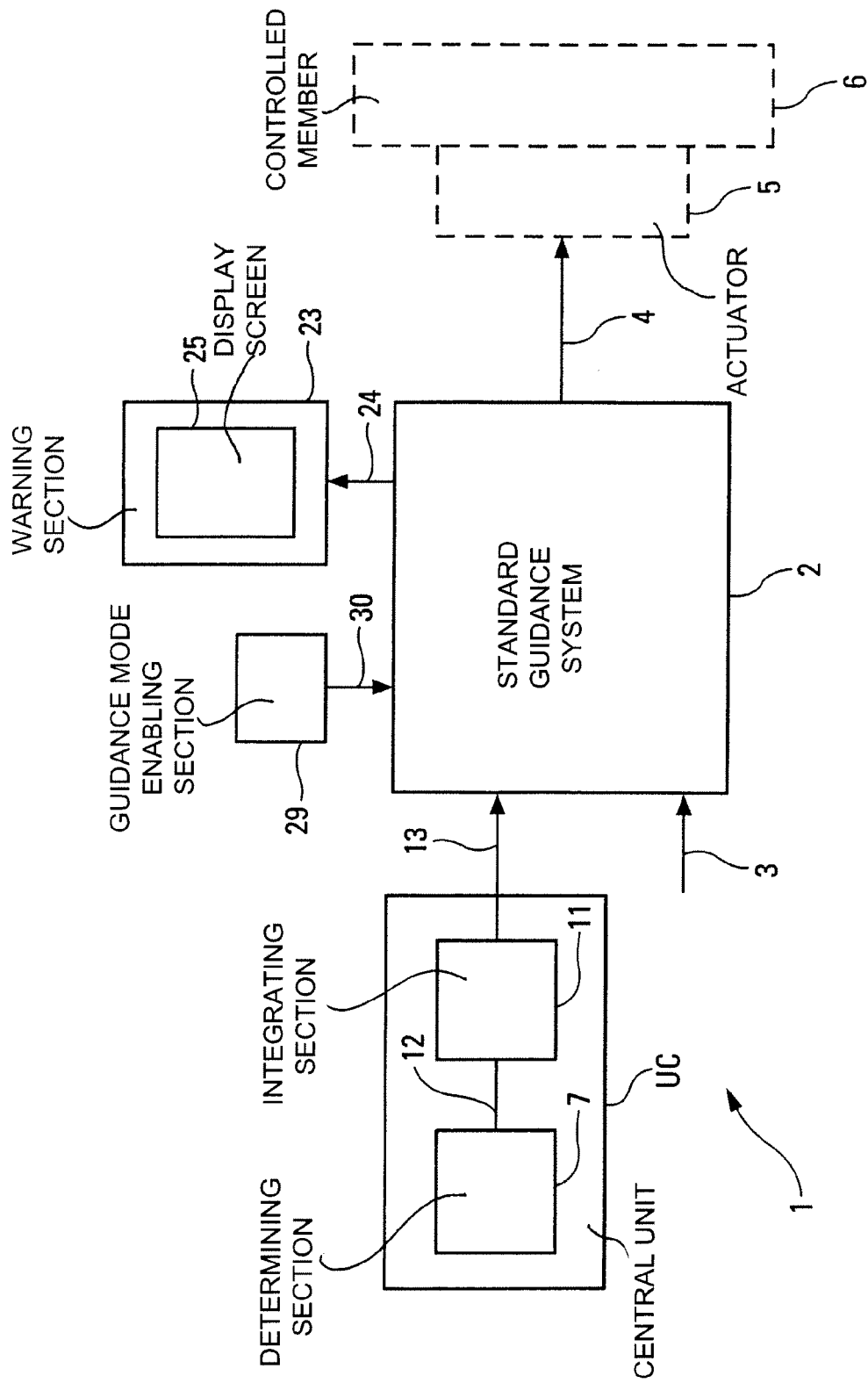
FIG. 1 is the schematic diagram of a device in accordance with the invention.

The device 1 in accordance with the invention and represented diagrammatically in FIG. 1 is intended to automatically guide an aircraft A, in particular a military transport plane, for a flight which is at least in part at low altitude.

To do this, said device 1 comprises a standard guidance system 2 which receives information in particular by way of a link 3 and which is intended to guide the aircraft A along a received flight trajectory T0. Said guidance system 2 which comprises for example an automatic pilot, determines orders for piloting the aircraft A, which are such that the latter follows said flight trajectory T0. These piloting orders are transmitted by a link 4 to means of actuation 5 of controlled members 6 such as, for example, control surfaces (rudder, elevators, etc) of the aircraft A, said means of actuation 5 and said control members 6 being represented by broken lines in FIG. 1.

Figure 2:
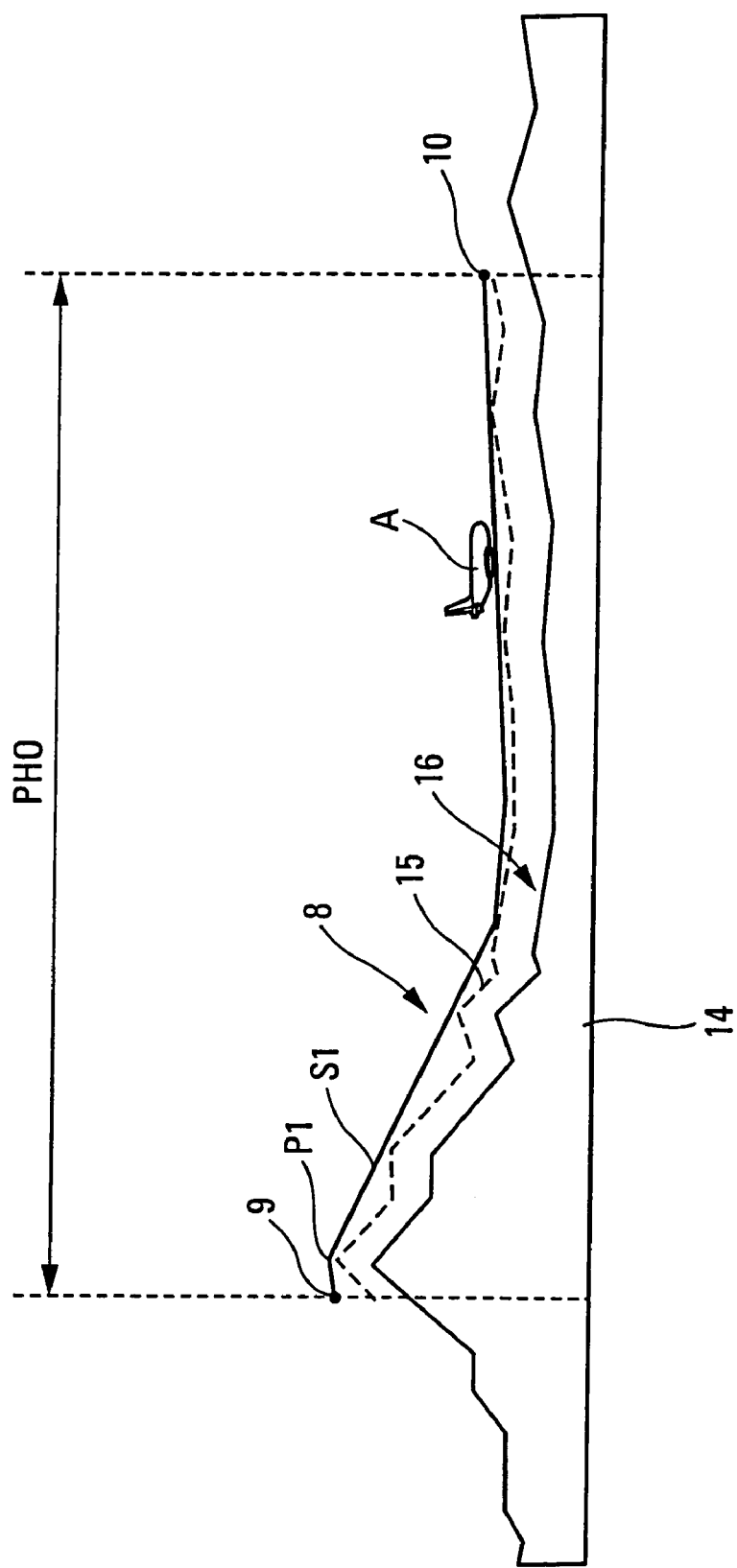
FIGS. 2 to 4 are graphics making it possible to show general aspects of the present invention.
Figure 3:
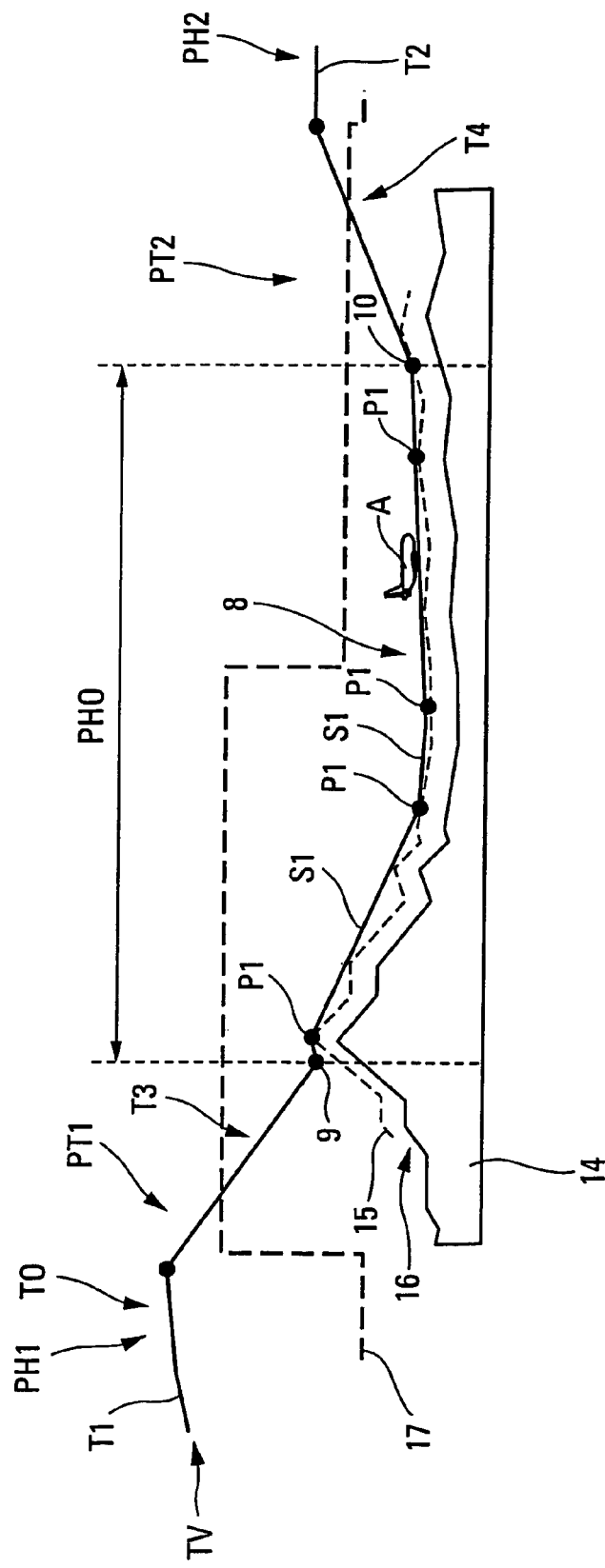

According to the invention, said device 1 moreover comprises:
means 7 for determining at least one LLF trajectory section 8, which is represented in FIG. 2, which corresponds to a low altitude trajectory part making it possible for the aircraft A to follow the terrain 14 overflown, which is able to be flown by the aircraft A and which takes account of predictions of mass and of speed, as well as predictions of climb and descent performance of the aircraft A. Said LLF trajectory section 8 comprises a point of entry 9 at its start and a point of exit 10 at its other end; and
means 11 which are connected by a link 12 to the means 7, for integrating said LLF trajectory section 8 in the flight trajectory T0, between a first trajectory part T1 corresponding to a first phase of flight PH1 (for example a cruising phase) and a second trajectory part T2 corresponding to a second phase of flight PH2 (for example also a cruising phase), by providing respectively first and second transition phases PT1 and PT2 corresponding, respectively, to a phase of capture and to a phase of exit of said LLF trajectory section 8, as represented in FIG. 3. Said LLF trajectory section 8 of low altitude flight is therefore situated at the stage of a PHO intermediate phase (of low altitude flight).

In a particular embodiment, said means 7 and 11 are grouped together within a central unit UC which is connected by a link 13 to said guidance system 2.

Moreover, according to the invention, said guidance system 2 is formed in such a way as to automatically guide the aircraft A so that, successively, it captures, follows and leaves said LLF trajectory section 8.

The flight trajectory T0 comprises a lateral trajectory TL defined in a horizontal plane and comprising rectilinear segments S2 joining up with waypoints P2 and a vertical trajectory TV (or flight profile) defined in a vertical plan. The LLF trajectory section 8 at low altitude allows the aircraft A to follow as closely as possible the terrain 14 overflown.

In a preferred embodiment represented in FIGS. 2 and 3, said LLF trajectory section 8 comprises rectilinear segments S1 joining up with points P1 in the vertical plane.

For safety reasons, this LLF trajectory section 8 is determined on the basis of a terrain profile 15 which is situated above the relief 16 of the terrain 14. Moreover, represented by broken lines (in particular in FIG. 3) is a curve 17 exhibiting a plurality of different altitudes, each of said altitudes corresponding to a safety altitude, above which the aircraft A is at no risk of collision with the terrain 14 overflown.

Figure 4:
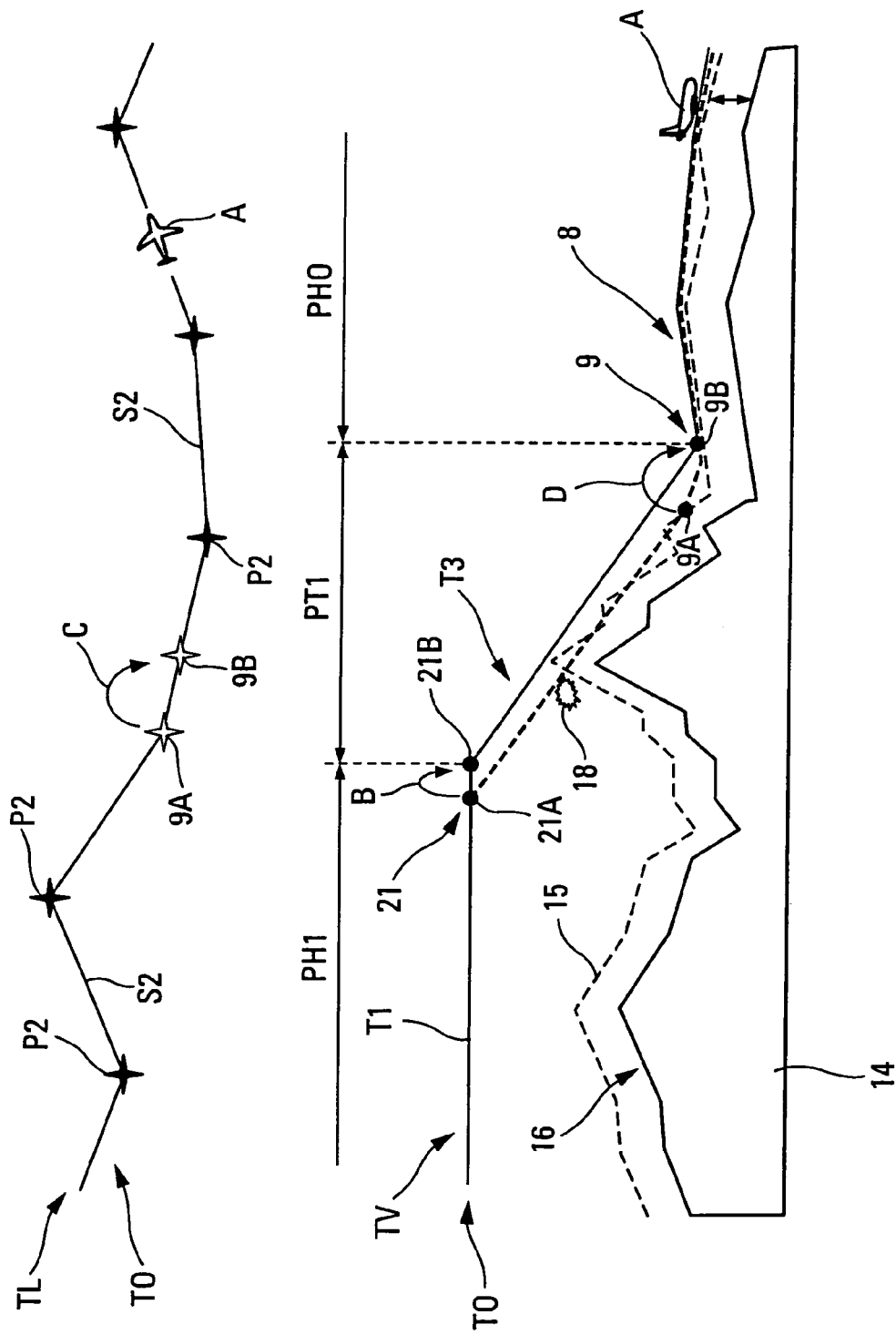

Within the framework of the present invention, an LLF trajectory section 8 can:
  either be planned during mission preparation, it then forms part of the planned flight trajectory T0, as represented for example in FIGS. 3 and 4;
  or, without having been planned initially, be defined during the flight, in the form of a "chance LLF trajectory section".

An LLF trajectory section 8 is the lowest route above the relief 16 of the terrain 14 which makes it possible to pass above the highest peaks between the points of entry and of exit 9 and 10, with respect to the predicated climb and descent performance of the aircraft A over this LLF trajectory section 8.

Regarding the transition phases PT1 and PT2, the first phase PT1 is generally a descent phase and the second phase PT2 is generally a climb phase. Each of said phases PT1 and PT2 comprising respectively trajectories T3 and T4, may be effected:
  either, according to a single rectilinear segment with constant slope, as represented for example in FIG. 3;
  or, according to a plurality of horizontal levels separated by corresponding climb or descent slopes. This makes it possible to minimize the duration of climb or of descent, in particular when the environment is dangerous.

When the point of entry 9 and the angle of descent of the capture transition phase PT1 are not compatible with the terrain profile 15, as indicated by a characteristic sign 18 in FIG. 4 (evidencing interception of the terrain profile 15 by the capture trajectory T3 shown dashed), the device 1 updates a capture point 21 (corresponding to the start of the capture phase PT1) which is brought from a position 21A to a position 21B, as illustrated by an arrow B in FIG. 4. This brings about a displacement of the entry point 9 between a position 9A and a position 9B, as illustrated on the lateral trajectory TL (represented on the upper part of FIG. 4) by an arrow C and on the vertical trajectory TV (represented on the lower part of FIG. 4) by an arrow D.

In a first embodiment represented in FIGS. 5 to 11, said LLF trajectory section 8 is planned and forms part of a flight trajectory T0 planned in particular during mission preparation (or during the flight). For the sake of clarification of the drawing, the flight phase PH1 is a cruising phase, during which the aircraft A is guided with the aid of a standard guidance mode, guiding the aircraft A:
  vertically, in accordance with an altitude preset; and
  laterally, in accordance with a course preset.

Figure 5:
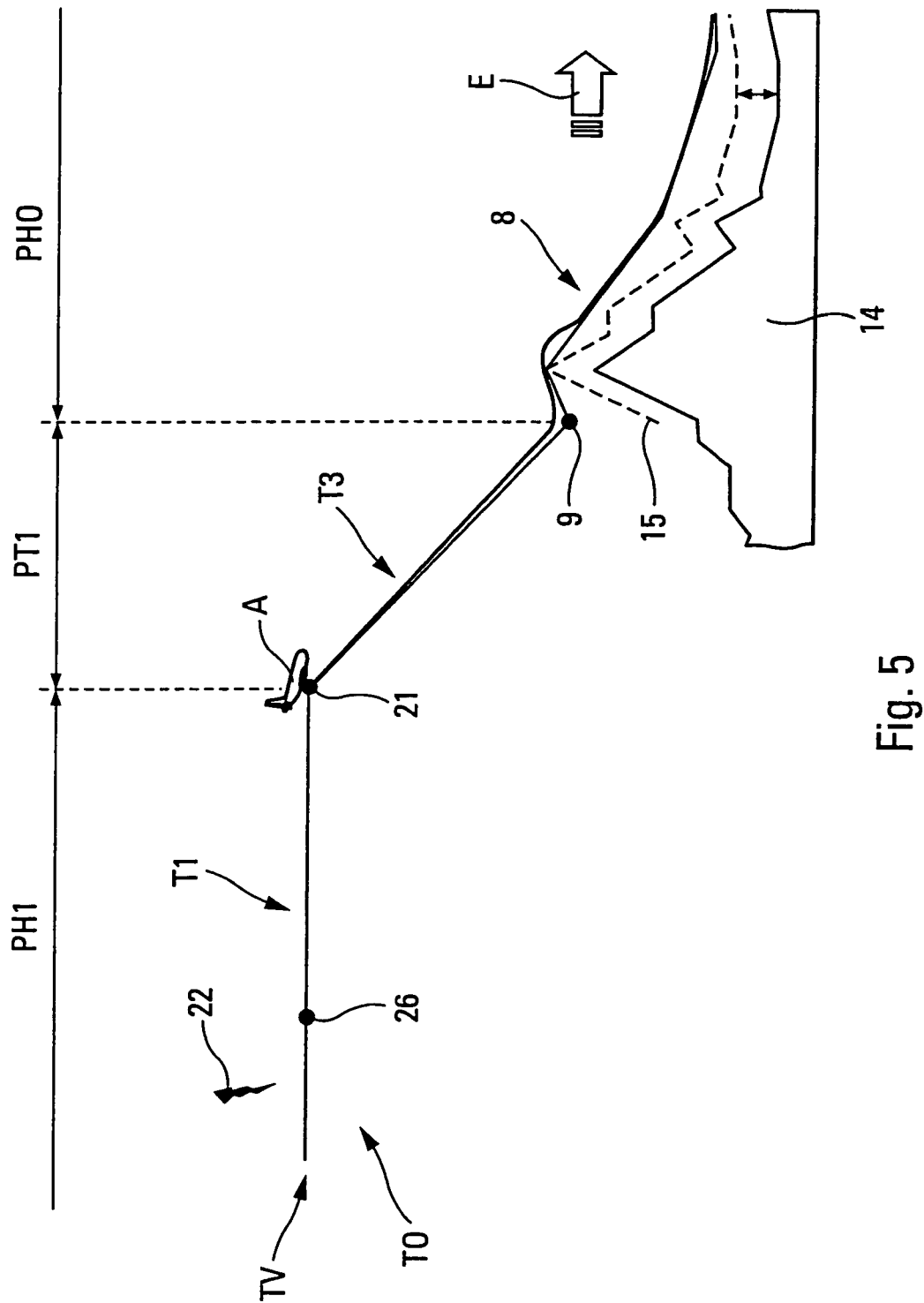
FIGS. 5 and 6 are graphics illustrating the capture and the following of a planned LLF trajectory section, in managed mode.
Figure 6:
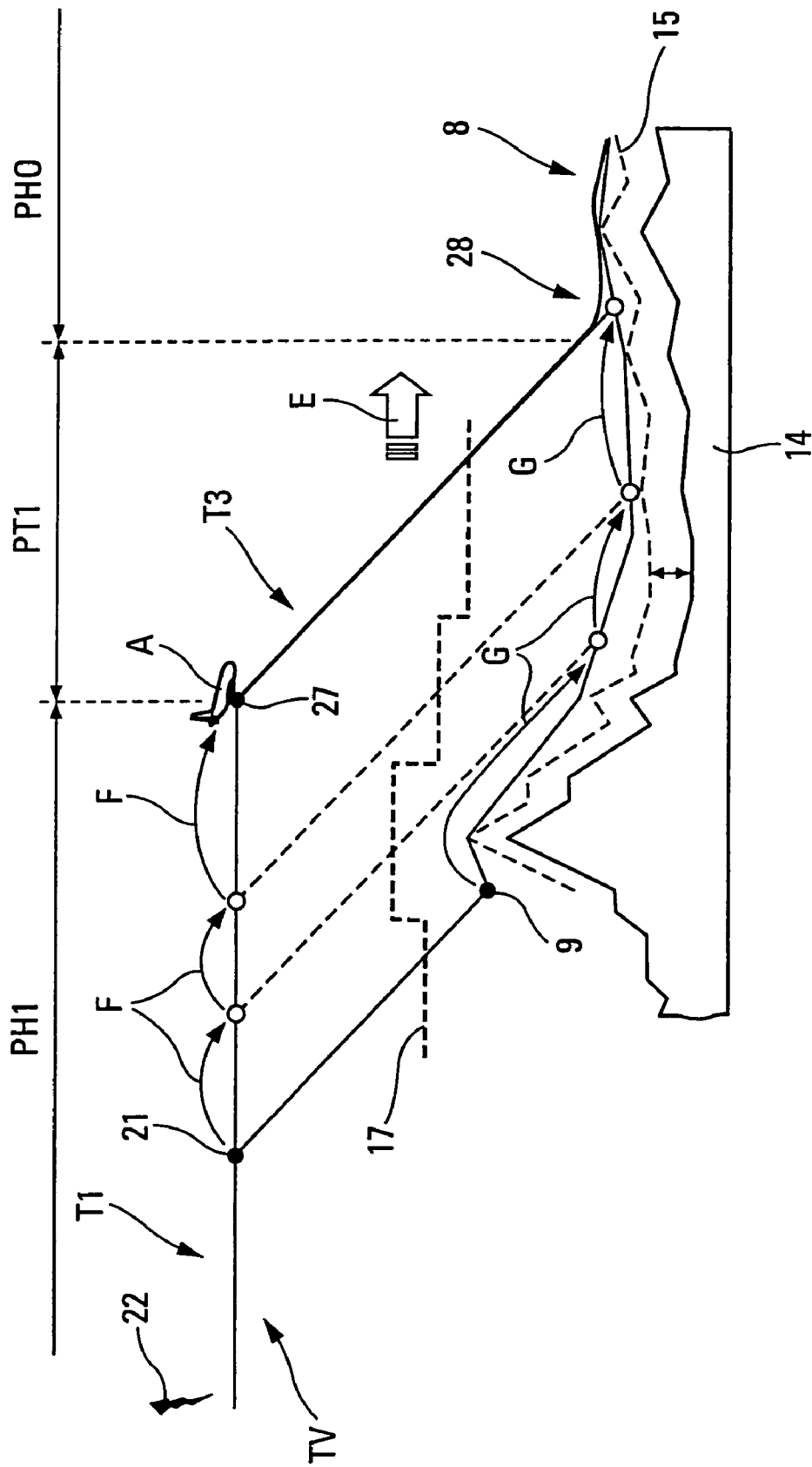
Figure 7:
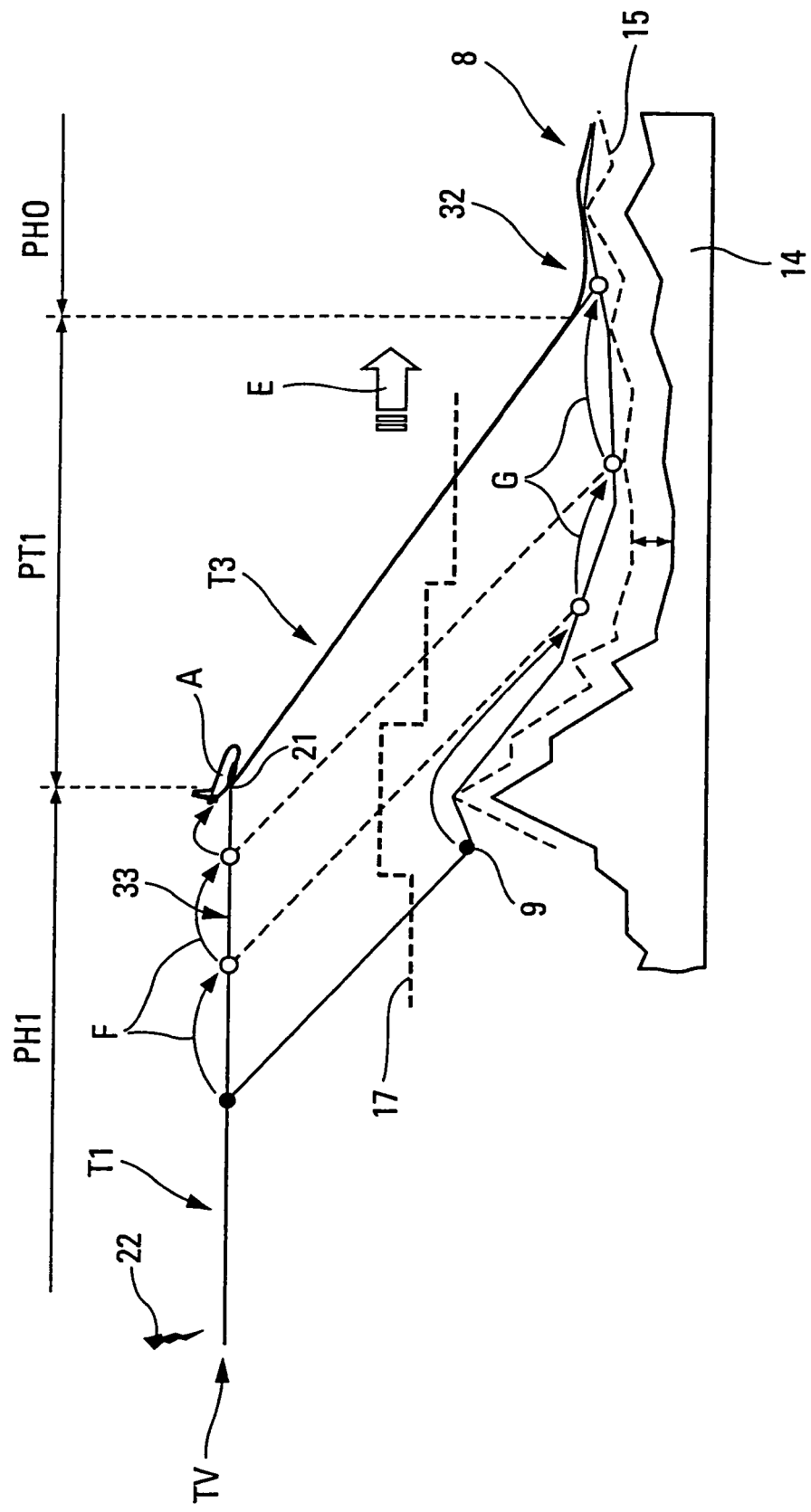
FIGS. 7 and 8 are graphics illustrating the capture and the following of a planned LLF trajectory section, in selected mode.
Figure 8:
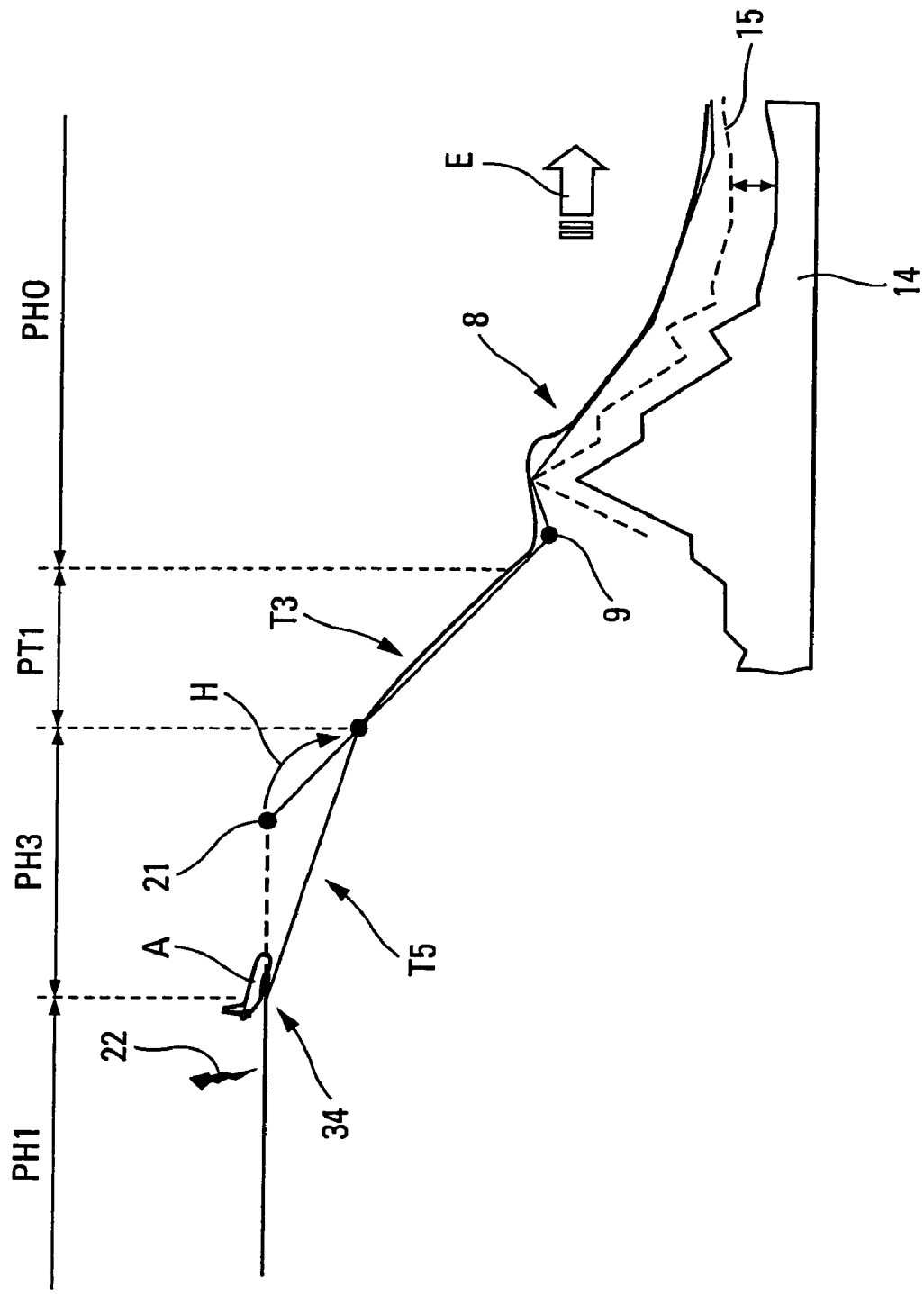

The manner of engaging the following of said planned LLF trajectory section 8 is illustrated:
  in FIGS. 5 and 6, for a managed mode; and
  in FIGS. 7 and 8, for a selected mode.

In a managed mode, when the aircraft A is at a predetermined distance upstream of the capture point 21 corresponding to the start of said transition phase PT1 intended to capture the section of the LLF trajectory 8, the device 1 in accordance with the invention forewarns the pilot of this situation, as illustrated by a characteristic sign 22 in FIG. 5, which evidences this predetermined distance with respect to said capture point 21. In this case, as indicated previously, the aircraft A is guided vertically in accordance with an altitude preset.

The device 1 forewarns the pilot with the aid of a standard means 23 which is for example connected by a link 24 to said guidance system 2 and which can present information, in a visual manner, for example on a display screen 25, and/or audibly. Said means 23 also indicates to the pilot that he must now enable an LLF guidance mode comprising, according to the invention an automatic capture mode and an automatic following mode, respectively, to capture and follow said LLF trajectory section 8.

In the example represented in FIG. 5, the pilot enables said LLF guidance mode at a point 26, upstream of said capture point 21. In this case, said LLF guidance mode is engaged automatically:
  as regards capture, at said capture point 21, this being so throughout the transition phase PT1; and
  as regards the following of the LLF trajectory section 8, when said LLF trajectory section 8 is captured, that is to say at the latter's point of entry 9, this being so throughout said phase of following PHO.

Thus, by virtue of the invention, when the LLF guidance mode is enabled, it is engaged automatically when the conditions of capture of the LLF trajectory section 8 are all satisfied, that is to say at said capture point 21. The enabling of the LLF guidance mode signifies that the subsequent descent is a descent for capturing the LLF trajectory section 8. This capture phase PT1 is presented to the pilot with the aid of the means 23.

Furthermore, the mode of following the LLF trajectory 8 is engaged as soon as the conditions for following are all satisfied, that is to say at the entry point 9.

On the other hand, when the pilot or a crew member does not enable said LLF guidance mode before said or at said capture point 21, as represented in FIG. 6, the aircraft A continues to fly in the same mode, that is to say at the same altitude in the example represented.

In this case, the aircraft A cannot join up with the LLF trajectory section 8 at said entry point 9. This situation is illustrated by the displacement, along arrows F of the capture point 21 (and of the descent trajectory T3), and along arrows G of the entry point 9.

When the pilot enables said LLF guidance mode at a point 27 downstream of said capture point 21, the LLF guidance mode is then engaged right away automatically as regards capture. Moreover, as regards following, said LLF guidance mode is engaged automatically when the LLF trajectory section 8 is captured, at an auxiliary point 28 which is, naturally, situated on said LLF trajectory section 8 downstream of said initial entry point 9.

Thus, by virtue of the invention, the engagement of the LLF guidance mode requires a limited number of actions on the part of the pilot, namely simply the enabling of said LLF guidance mode, with the aid of a standard means 29 which is for example connected by way of a link 30 to said guidance system 2.

In a selected mode, to engage the following of said planned LLF trajectory section 8, the pilot chooses a capture law. The example of FIG. 7 pertaining to this selected mode corresponds to that of FIG. 6 pertaining to the managed mode. Capture of the LLF trajectory section 8 is effected with the aid of the capture law selected on the basis of the point 21. In this case, the device 1 automatically switches from said selected mode to a managed mode of the aforesaid type (following then being effected with the aid of the LLF guidance mode), at a point 32, when the aircraft A piloted according to said capture law intercepts said LLF trajectory section 8 and when said LLF guidance mode have previously been enabled by the pilot, for example at a point 33. Consequently, the following of the LLF trajectory section 8 is effected according to a managed mode, in the aforesaid manner.

It will be noted that, within the framework of the present invention, the descent, starting from the capture point 21 in order to capture the LLF trajectory section 8, can also be effected according to a standard descent mode (with given slope and given speed), doing so until proximity with said LLF trajectory section 8. During this descent, said standard descent mode is engaged, but the LLF guidance mode is merely enabled. When the aircraft arrives in proximity to said LLF trajectory section 8, the capture of the latter is effected by the LLF guidance mode, then the aircraft is guided along said LLF trajectory section 8.

On the other hand, if the capture law is engaged at a point 34, before the capture point 21 (and if the LLF guidance mode is enabled), the aircraft A is piloted according to said selected capture law, as illustrated by a trajectory portion T5 in FIG. 8, in such a way as to create an intermediate phase PH3. In such a situation, the device 1 automatically switches from said selected mode to a managed mode, when the aircraft A intercepts said capture trajectory T3 of said transition phase PT1 (thereby bringing about a displacement of the capture point 21, shown by an arrow H) as illustrated in FIG. 8, or else when it intercepts said LLF trajectory section 8. Said intermediate phase PH3 is therefore situated between the flight phase PH1 and the capture phase PT1 which corresponds to the capture of the managed descent. In FIG. 8, the end of the capture phase PT1 is situated slightly upstream of the entry point 9.

Figure 9:
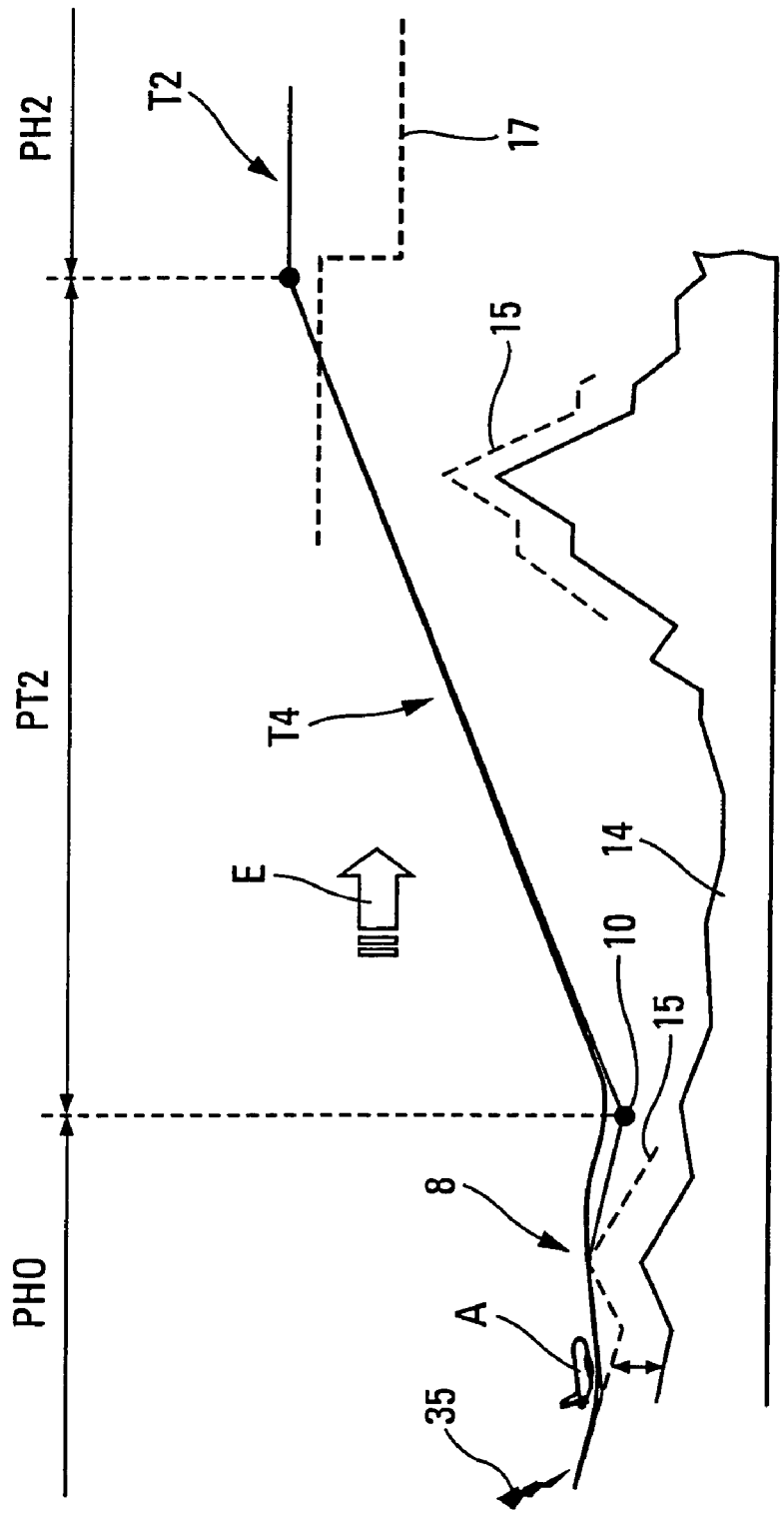
FIGS. 9 and 10 are graphics illustrating an exit from a planned LLF trajectory section, in managed mode.
Figure 10:
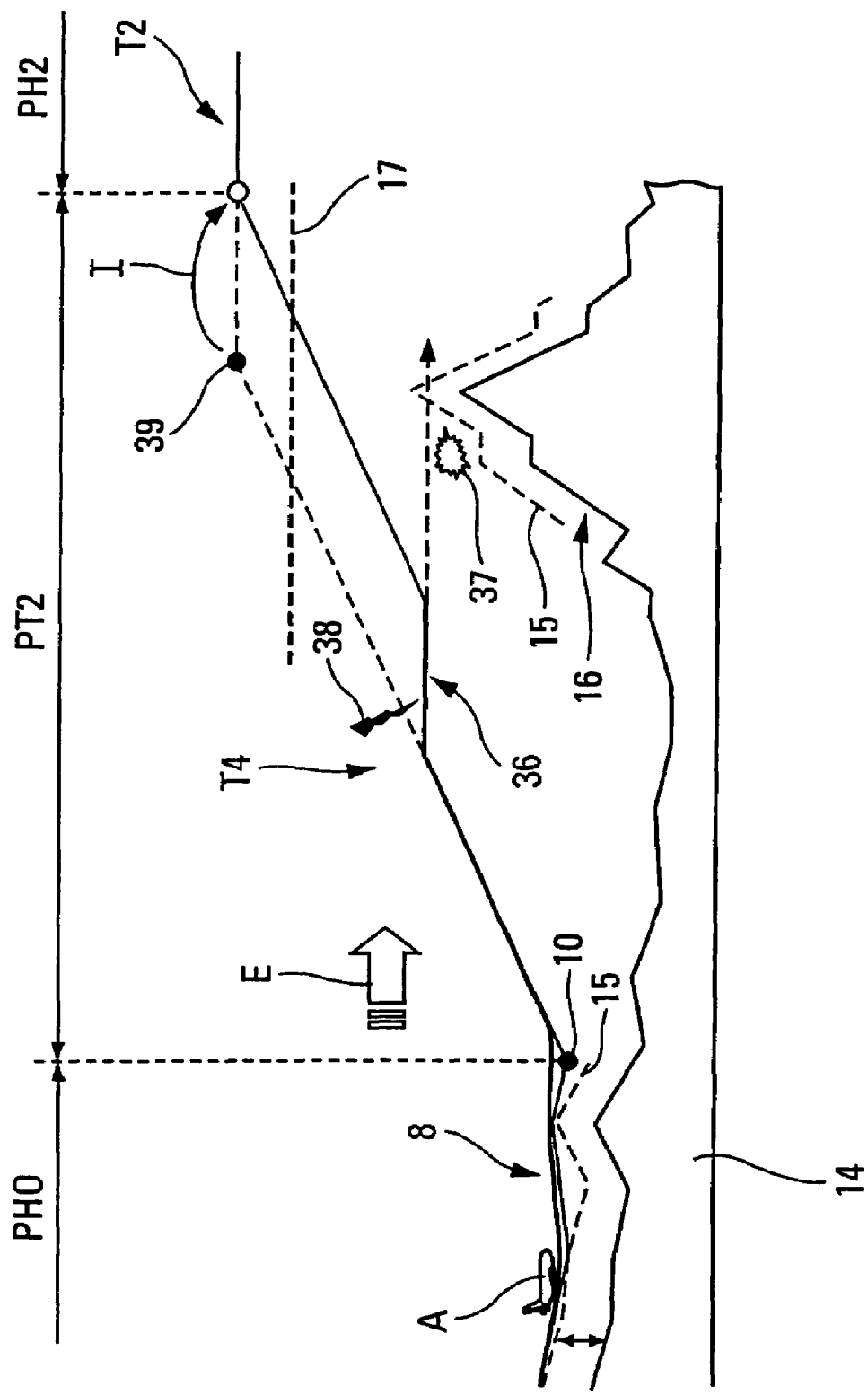
Figure 11:
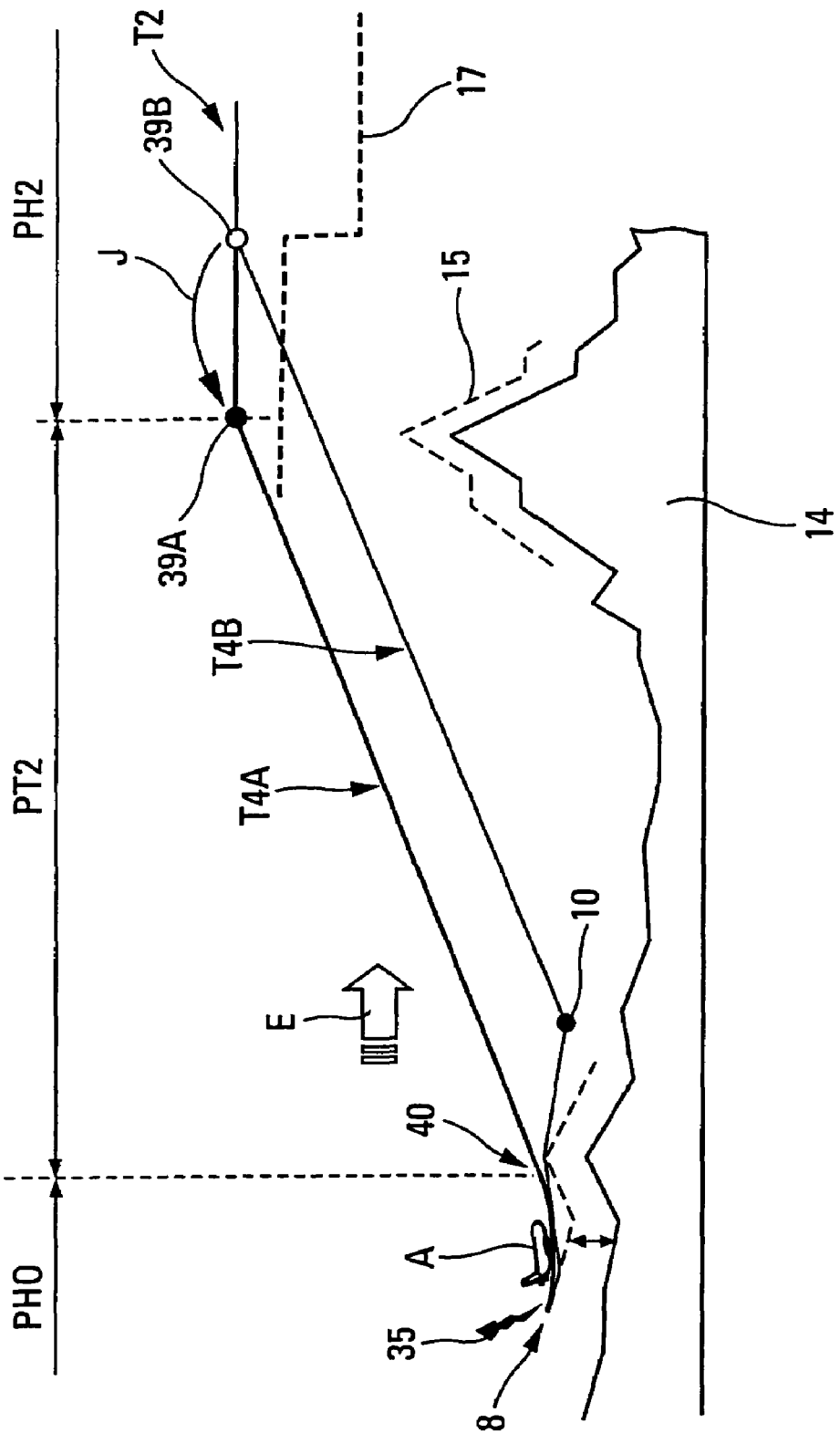
FIG. 11 is a graphic illustrating an exit from a planned LLF trajectory section, in selected mode.

Additionally, the exit of an LLF trajectory section 8 is illustrated:

in a managed mode, in FIGS. 9 and 10; and
in a selected mode, in FIG. 11.

It is assumed that the aircraft A is guided along the LLF trajectory section 8 with the aid of an LLF guidance mode of the aforesaid type, in a managed mode.

When the aircraft A reaches a point 35 which is a predetermined distance upstream of the exit point 10 corresponding to the end of the LLF trajectory section 8, the device 1 forewarns the pilot, in particular with the aid of the means 23, and invites him to enable an exit mode (for example with the aid of the means 29) so as to automatically exit said LLF trajectory section 8. Said exit mode is then engaged automatically when the aircraft A arrives at said exit point 10. The aircraft A is then brought directly along the trajectory T4 to a predetermined altitude corresponding to that of the trajectory T2 of the flight phase PH2.

Thus, by virtue of the invention, and in contrary distinction to known standard solutions, the climb of the aircraft A is not immediate, but it is delayed until said exit point 10. This is why the exit mode is not engaged, but only enabled by the pilot, and it is then engaged automatically when the aircraft A arrives at said exit point 10.

Naturally, said exit trajectory T4 may be direct, as represented in FIG. 9. It may however, also exhibit horizontal levels 36, as represented in FIG. 10. However, if a horizontal level 36 does not allow exit in complete safety, and runs the risk of intercepting the terrain profile 15, as illustrated by a characteristic sign 37 in FIG. 10, the device 1 in accordance with the invention emits an alarm, as shown by a characteristic sign 38.

In this case, the displacement of the point 39, illustrated by an arrow I, is not appropriate so that it is preferable to instruct a direct climb.

Additionally, to leave an LLF trajectory section 8, in a selected mode, the pilot chooses an exit law. Thus, the pilot can anticipate an exit of the LLF trajectory section 8, for example at a point 40 which is situated upstream of the exit point 10 on the LLF trajectory section 8. One thus obtains an exit trajectory T4A anticipated with a point 39A of the start of trajectory T2, likewise anticipated, as illustrated by an arrow J, instead of a theoretical exit trajectory T4B (in managed mode) with a corresponding point 39B.

Figure 12:
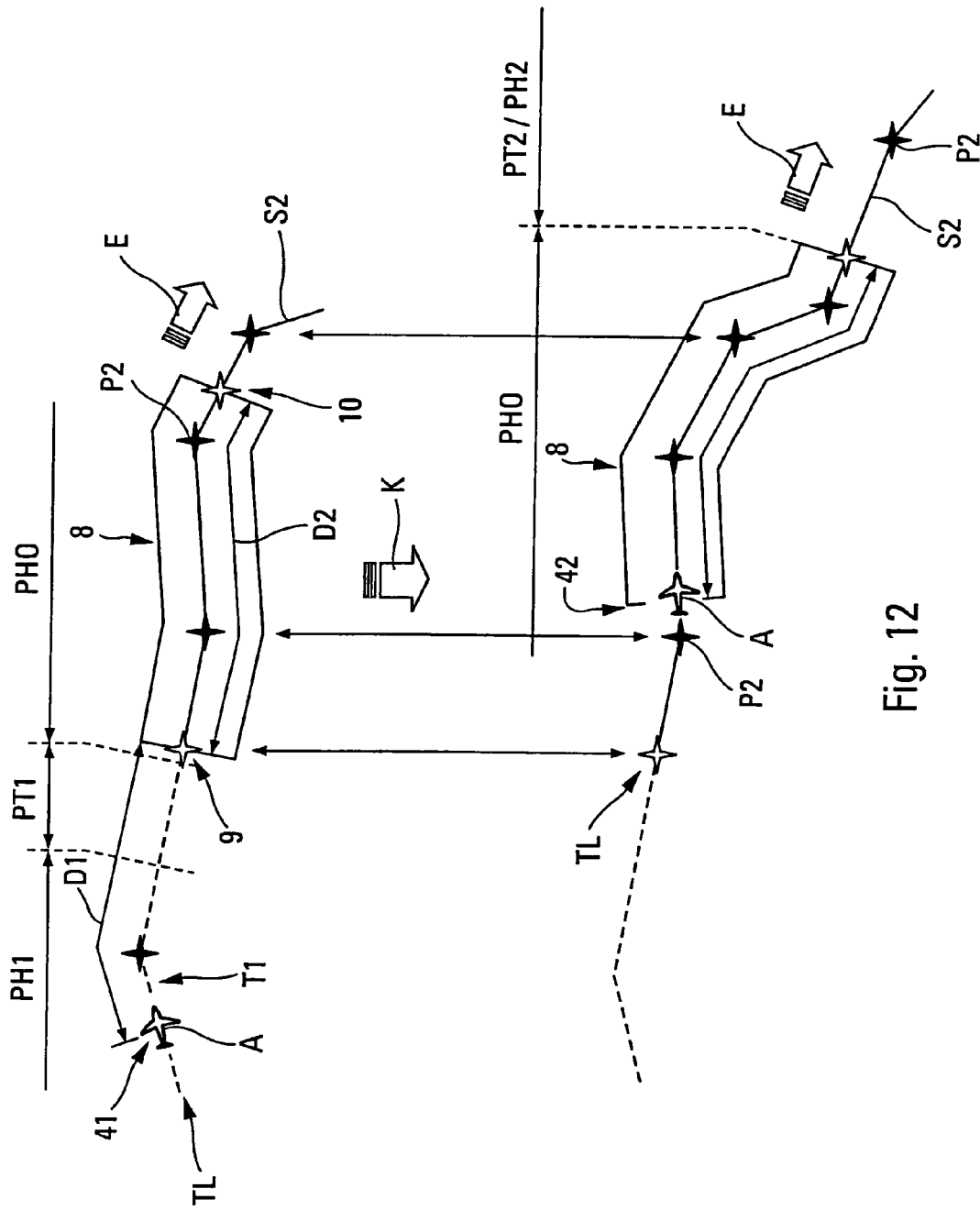
FIGS. 12 to 14 are graphics illustrating particular features pertaining to a chance LLF trajectory section.
Figure 13:
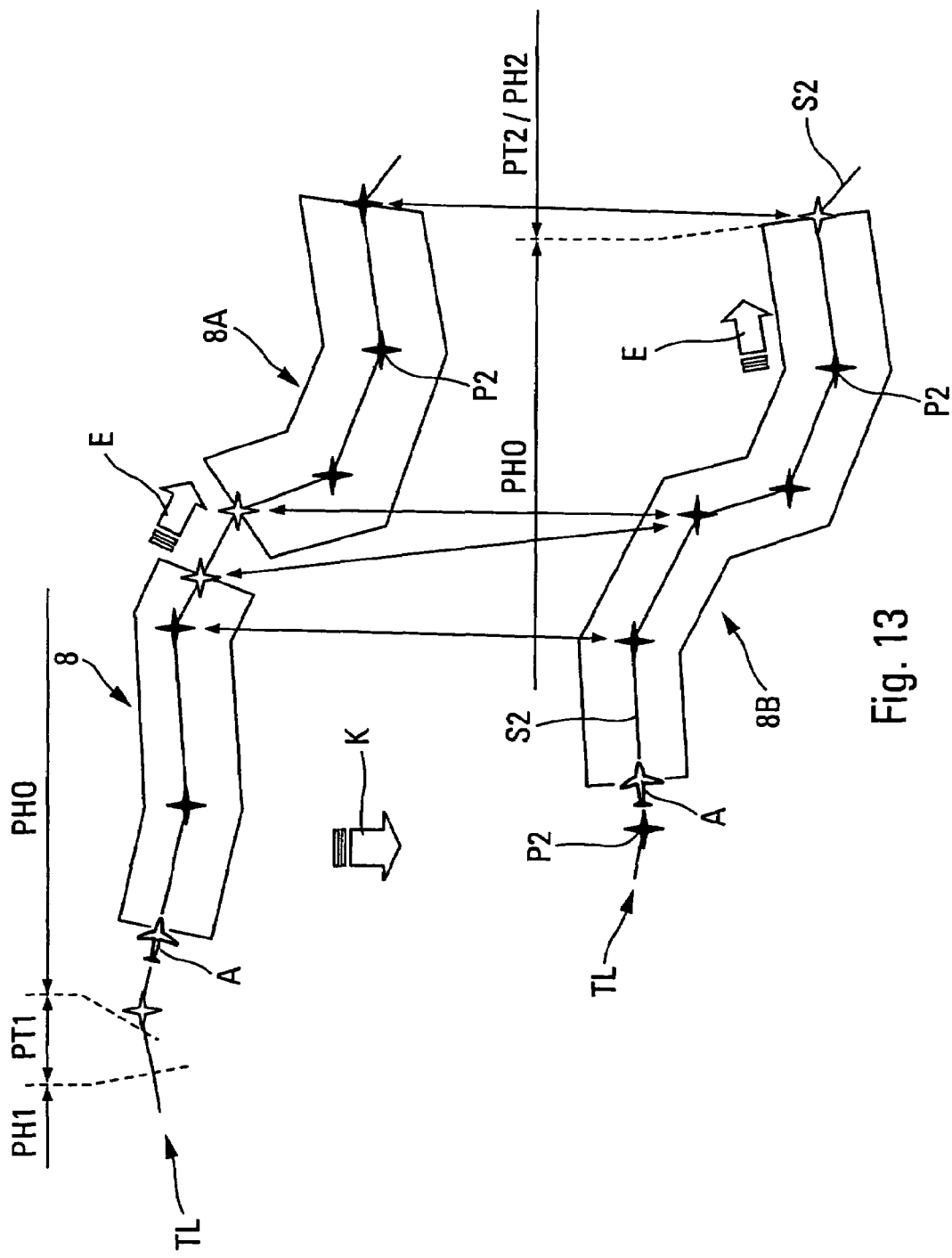
Figure 14:
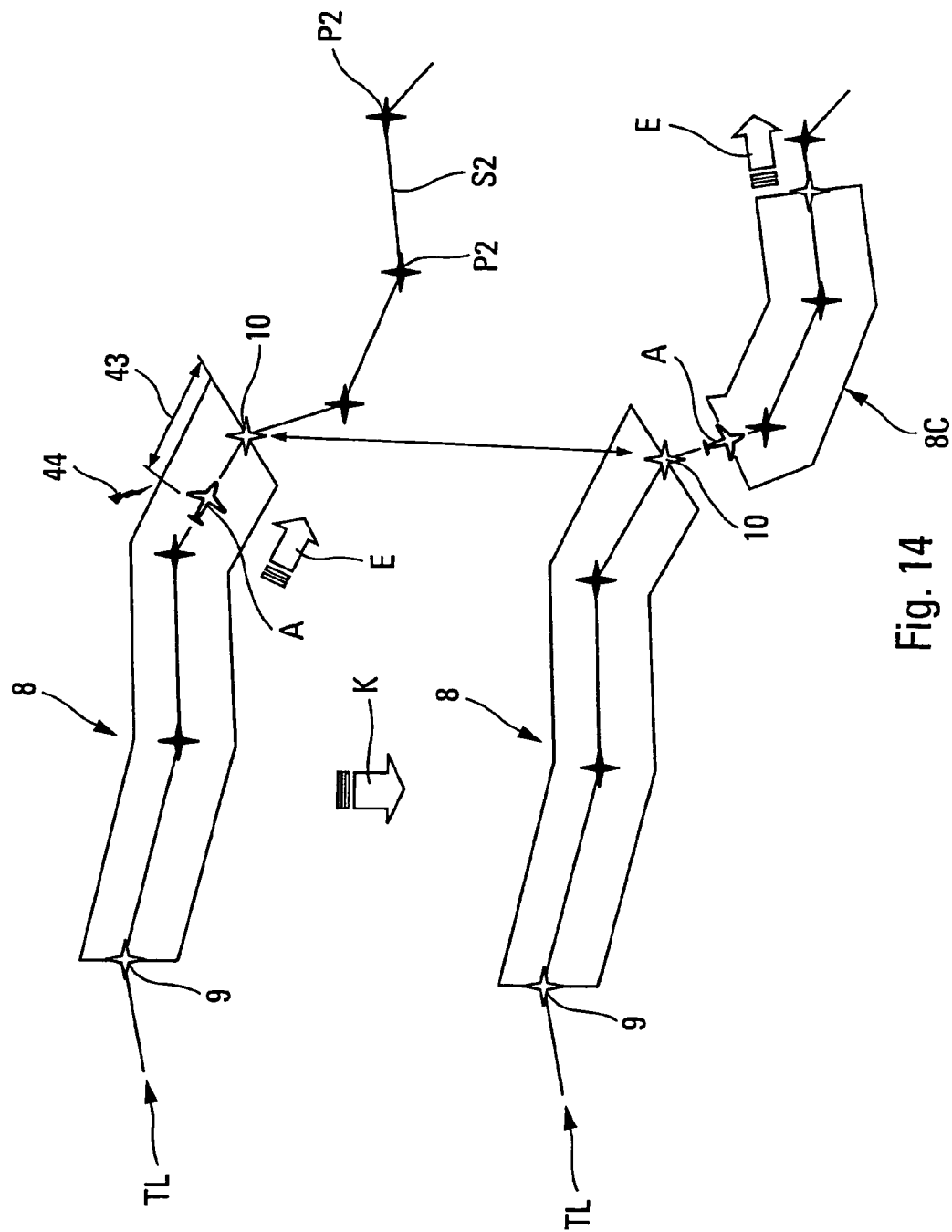

Additionally, in the embodiment represented in FIGS. 12 to 14, no LLF trajectory section 8 has been planed during mission preparation or aboard the aircraft and is not therefore available when an LLF guidance mode is required by the pilot. The aircraft A is assumed to fly along a flight trajectory part T1 pertaining to a flight phase PH1, in particular a high altitude cruising phase.

For operational reasons, it may happen that the crew has to make the aircraft A descend and has to make it fly at low altitude, but does not have time to plan an LLF trajectory section 8. In this case, the characteristics described hereinbelow are proposed.

When a pilot enables an LLF guidance mode (with the aid of means 29), while no LLF trajectory section 8 has been defined or while an LLF trajectory section which has been defined is far away, the device 1 in accordance with the invention automatically determines an LLF trajectory section 8 and presents it to the pilot by way of the means 23 doing so as rapidly as possible as soon as said LLF guidance mode is enabled.

Since no entry point 9 or exit point 10 has been defined, the corresponding (so-called "chance") LLF trajectory section 8 is calculated ahead of the current position of the aircraft A, as follows:

the point of entry 9 of this LLF trajectory section 8 is situated a predetermined distance D1 ahead of the current position 41 of the aircraft A, as represented in FIG. 12. The distance D1 is the smallest possible. It depends on the computational capabilities of the device 1; and the point of exit 10 of this LLF trajectory section 8 is situated a predetermined distance D2 ahead of said entry point 9. The distance D2 may correspond in particular to a predetermined flight duration, for example to five minutes of flight.

The LLF trajectory section 9 therefore exhibits a distance D2.

Moreover:

the slope of each of the transition phases PT1, PT2 which have constant slope, corresponds to a predetermined slope, which is however, modifiable by a pilot of the aircraft A, for example with the aid of an integrated means (not represented); and the speed of the aircraft A along the LLF trajectory section 8 corresponds to a predetermined speed, which is likewise modifiable by a pilot of the aircraft A.

According to the invention, said chance LLF trajectory section 8 and said exit point 10 are modified continuously in such a way that they displace together with the aircraft A, ahead of the (moving) position 42 of said aircraft A, at the same speed, as illustrated in FIG. 12 between a first moment represented on the upper part of said FIG. 12 and a second later moment represented on the lower part of said FIG. 2. The flow of time between these two moments is illustrated by an arrow K. It will be noted that FIGS. 13 and 14 are formed on the same principle.

Additionally, if said chance LLF trajectory section 8 (of length D2) which displaces ahead of the current position of the aircraft A encounters an auxiliary LLF trajectory section 8A (of length D2A), which has been planned (for example during mission preparation) in the aforesaid manner, the device 1 in accordance with the invention merges these two trajectory sections 8 and 8A to form a single overall LLF trajectory section 8B (of length D2B: D2B=D2+D2A), as illustrated in FIG. 13. This avoids the need for the aircraft A to have to carry out a complex and risky climb and descent maneuver between the two LLF trajectory sections 8 and 8A. The overall LLF trajectory section 8B is naturally determined in the same manner as an aforesaid LLF trajectory section 8.

Additionally, in the case where the aircraft A is guided along a planned LLF trajectory section 8 and is approaching the exit point 10 (a predetermined distance 43), the crew is forewarned (indication 44) and must enable the exit mode in order to leave said LLF trajectory section 8 at said exit point 10, in the managed mode. If the crew does not enable this exit mode, the aircraft A continues to fly at low altitude up to said exit point 10 where the LLF guidance mode (mode of following of the LLF trajectory section 8) is then disengaged. Consequently, if no action is taken, the situation becomes dangerous. However, the crew may wish to continue to fly at low altitude, without using any planned (during mission preparation or aboard the aircraft) LLF trajectory section 8.

To solve this problem, the device 1 in accordance with the invention automatically calculates at the end of the planned LLF trajectory section 8, a chance LLF trajectory section 8C, thus allowing the aircraft A to continue to fly at low altitude after said point 10.

The invention claimed is:

1. A method of automatic guidance of an aircraft, for a flight at least in part at low altitude, the method comprising:
a) determining at least one LLF (low level flight) trajectory section corresponding to a low altitude trajectory part which makes it possible to follow the terrain overflown, which is able to be flown by the aircraft and which takes account of predictions of mass and of speed, as well as of predictions of climb and descent performance of the aircraft, said LLF trajectory section comprising an entry point and an exit point;
b) integrating said LLF trajectory section between a first trajectory part corresponding to a first phase of flight and a second trajectory part corresponding to a second phase of flight, by providing respectively first and second transition phases; and
c) automatically guiding the aircraft in such a way that, successively, it captures, follows and leaves said LLF trajectory section.

2. The method as claimed in claim 1, wherein at least one of said transition phases corresponds to a transition at constant slope.

3. The method as claimed in claim 1, wherein at least one of said transition phases corresponds to a transition exhibiting a plurality of horizontal levels.

4. The method as claimed in claim 1, further comprising automatically updating a capture point corresponding to the start of said first transition phase intended to capture said LLF trajectory section.

5. The method as claimed in claim 1, wherein said LLF trajectory section is planned and forms parts of a planned flight trajectory.

6. The method as claimed in claim 5, further comprising, to engage the following of said planned LLF trajectory section in a managed mode, forewarning the pilot when the aircraft is a predetermined distance upstream of a capture point corresponding to the start of said first transition phase intended to capture said LLF trajectory section, and inviting the pilot to enable an LLF guidance mode comprising an automatic capture mode and an automatic following mode, respectively, for capturing and following said LLF trajectory section.

7. The method as claimed in claim 6, further comprising:
a) if the pilot enables said LLF guidance mode before the aircraft reaches said capture point, automatically engaging said LLF guidance mode as regards capture at said capture point, and as regards following when the LLF trajectory section is captured, at the entry point of said LLF trajectory section; and
b) if the pilot enables said LLF guidance mode at a first auxiliary point downstream of said capture point, delaying the engagement of said LLF guidance mode until said first auxiliary point, at which it is then engaged automatically as regards capture, and as regards following it is engaged automatically when the LLF trajectory section is captured, at a second auxiliary point situated on said LLF trajectory section downstream of said entry point.

8. The method as claimed in claim 7, further comprising, in case b), indicating said second auxiliary point to a pilot of the aircraft.

9. The method as claimed in claim 6, further comprising, to leave an LLF trajectory section, in a managed mode, forewarning the pilot when the aircraft is a predetermined distance upstream of the exit point corresponding to the end of the LLF trajectory section, and inviting the pilot to enable an exit mode for automatically exiting said LLF trajectory section, said exit mode being engaged automatically when the aircraft arrives at said exit point.

10. The method as claimed in claim 9, further comprising implementing an exit of said exit mode with horizontal levels and emitting an alarm signal, when a horizontal level of said exit with horizontal levels is incompatible with a profile of the terrain.

11. The method as claimed in claim 5, wherein, to engage the following of said planned LLF trajectory section, in a selected mode, the pilot chooses a capture law.

12. The method as claimed in claim 11, further comprising automatically switching from said selected mode to a managed mode when the aircraft piloted according to said capture law intercepts said first capture transition phase or said LLF trajectory section.

13. The method as claimed in claim 11, wherein, to leave an LLF trajectory section, in a selected mode, the pilot chooses an exit law.

14. The method as claimed in claim 1, further comprising automatically determining said LLF trajectory section during a flight of the aircraft.

15. The method as claimed in claim 14, wherein:
   said entry point of the LLF trajectory section is situated a predetermined distance ahead of the current position of the aircraft; and
   said exit point of the LLF trajectory section is situated a predetermined distance ahead of said entry point.

16. The method as claimed in claim 14, wherein the slope of a transition phase at constant slope corresponds to a predetermined slope, which is modifiable by a pilot of the aircraft.

17. The method as claimed in claim 14, wherein the speed of the aircraft along the LLF trajectory section corresponds to a predetermined speed, which is modifiable by a pilot of the aircraft.

18. The method as claimed in claim 14, further comprising continuously modifying said LLF trajectory section and said exit point in such a way that they displace together with the aircraft, ahead of the position of said aircraft.

19. The method as claimed in claim 18, further comprising, if said LLF trajectory section which is displacing encounters an auxiliary LLF trajectory section, planned during mission preparation, merging these two LLF trajectory sections to form a single overall LLF trajectory section.

20. The method as claimed in claim 14, wherein said first trajectory part is an auxiliary LLF trajectory section, which has been planned during mission preparation.

21. The method as claimed in claim 1, wherein said first and second trajectory parts are parts of a planned flight trajectory.

22. The method as claimed in claim 1, wherein at least one of said first and second trajectory parts is a planned low altitude flight trajectory capture trajectory.

23. An aircraft, which comprises a device able to implement the method specified under claim 1.

24. A device for automatic guidance of an aircraft, for a flight at least in part at low altitude, the device comprising:
   means for determining at least one LLF trajectory section corresponding to a low altitude trajectory part, which makes it possible to follow the terrain overflown, which is able to be flown by the aircraft and which takes account of predictions of mass and of speed, as well as predictions of climb and descent performance of the aircraft;
   means for integrating said LLF trajectory section in a flight trajectory, between a first trajectory part corresponding to a first phase of flight and a second trajectory part corresponding to a second phase of flight, by providing respectively first and second transition phases; and
   means for automatically guiding the aircraft in such a way that, successively, it captures, follows and leaves said LLF trajectory section.

25. An aircraft, which comprises a device such as that specified under claim 24.

* * * * *